(12) United States Patent
Kim

(10) Patent No.: US 6,545,529 B2
(45) Date of Patent: Apr. 8, 2003

(54) HIGH VOLTAGE GENERATING CIRCUIT

(75) Inventor: Yong-Hwan Kim, Choonhcheongbuk-Do (KR)

(73) Assignee: Hynix Semiconductor Inc., Ichon-shi (KR)

( * ) Notice: Subject to any disclaimer, the term of this patent is extended or adjusted under 35 U.S.C. 154(b) by 26 days.

(21) Appl. No.: 09/843,944

(22) Filed: Apr. 30, 2001

(65) Prior Publication Data

US 2001/0038306 A1 Nov. 8, 2001

(30) Foreign Application Priority Data

May 2, 2000 (KR) ........................................ 2000-23496

(51) Int. Cl.[7] .............................. G05F 1/10; G05F 3/02
(52) U.S. Cl. ...................................................... 327/536
(58) Field of Search ................................. 327/536, 537, 327/589, 291, 295

(56) References Cited

U.S. PATENT DOCUMENTS

| | | | | |
|---|---|---|---|---|
| 5,304,859 A | * | 4/1994 | Arimoto | ...................... 327/534 |
| 5,818,289 A | | 10/1998 | Chevallier et al. | ........... 327/536 |
| 5,943,226 A | * | 8/1999 | Kim | ............................ 327/537 |
| 6,107,863 A | * | 8/2000 | Iwata | ........................... 327/536 |
| 6,208,196 B1 | * | 3/2001 | St. Pierre | .................... 327/536 |
| 6,278,315 B1 | * | 8/2001 | Kim | ............................. 327/536 |

* cited by examiner

Primary Examiner—Terry D. Cunningham
Assistant Examiner—Quan Tra
(74) Attorney, Agent, or Firm—Fleshner & Kim, LLP

(57) ABSTRACT

A voltage generating circuit in accordance with the present invention includes a plurality of pump stages for alternatingly performing its pumping and pre-charging operation, and a pre-charge stage for pre-charging a first pump stage to a first reference voltage level (e.g., a power supply level). Each of the pump stages can include first and second pumps with a symmetrical structure for alternatingly performing a pumping operation and a pre-charging operation during a first clock cycle, and a charge transfer switch. The charge transfer switch is connected between the pumping capacitors of the first and second pumps, for thereby sharing the charge of each pumping capacitor of the first and second pumps before the first clock cycle is finished.

23 Claims, 12 Drawing Sheets

HIGH VOLTAGE GENERATING CIRCUIT

BACKGROUND OF THE INVENTION

1. Field of the Invention

The present invention relates to a semiconductor memory device, and more particularly, to a voltage generator for a semiconductor device.

2. Background of the Related Art

FIG. 1 illustrates an example of a conventional high voltage generating circuit described in U.S. Pat. No. 5,818,289. As illustrated therein, the conventional high voltage generating circuit includes oscillator 10, clock signal generator 12, pump circuit 14 and regulator 16.

The oscillator 10 generates oscillation signal OSC used to trigger the operation of the clock signal generator 12, and often is a ring oscillator initiated by enable signal EN. The clock signal generator 12 is triggered by the oscillation signal OSC to generate the clock signals used to control the operation of the pump circuit 14. The pump circuit 14 is composed of multi stage charge pumps. The pump circuit 14 outputs the higher voltages needed for programming and erasing memory cells by performing a pumping operation according to the clock signals outputted from clock signal generator 12.

The regulator 16 outputs reset signal RST used to turn the oscillator 10 off when the pump circuit 14 outputs the appropriate voltage. That is, the regulator 16 is used to control the operation of the oscillator 10 in order to cause the output of the pump circuit 14 to approach the desired output voltage. Thus, the oscillator 10 is turned on or off by the regulator 16, which in turn affects the frequency of the clock signals produced by the clock signal generator 12, to obtain the desired higher voltages from the pump circuit 14.

FIG. 2 is a circuit diagram of the clock signal generator 12. As illustrated in FIG. 2, flip-flop 220 outputs clock signals Ph0 and Ph0# by dividing the oscillator signal OSC by two, and is reset by the reset signal RST. A plurality of logic gates are used to produce the desired clock signals (Ph1#, Ph2#, Ph3, Ph1a, and Ph2a) that control the operation of the pump circuit 14 upon receipt of the oscillation signal OSC and/or the output of the flip-flop 220. Namely, inverters 231 and 232 provide the delays of the oscillation signal OSC that produce signal OSC-T.

NAND gate 234 and inverter 236 are used to produce clock signal Ph1 by using signals Ph0 and OSC-T. NAND gate 244 and inverter 246 are used to produce clock signal Ph2 by using signals Ph0# and OSC-T. The clock signal Ph1 is inverted by inverter 238 to produce clock signal Ph1#, and the clock signal Ph2 is inverted by inverter 248 to produce clock signal Ph2#.

Inverters 240 and 242 are used to provide a delayed version of signal Ph1, which produces clock signal Ph1d, and inverters 250 and 252 are used to provide a delayed version of signal Ph2, which produces clock signal Ph2d. In addition, NOR gate 254 produces clock signal Ph3 by NORing the oscillation signal OSC and the clock signals Ph1d and Ph2d. NAND gate 256 and inverter 258 produce clock signal Ph1a by using the oscillation signal OSC and the clock signal Ph1d, and NAND gate 260 and inverter 262 produce clock signal Ph2a by using the oscillation signal OSC and the clock signal Ph2d.

FIG. 3 illustrates a circuit diagram of the pump circuit 14 controlled by clock signals (Ph1#, Ph2#, Ph3, Ph1a, and Ph2a). As illustrated in FIG. 3, the pump circuit 14 includes first and second pump stages 160 and 170 connected by charge transfer switch 80. The input to first pump stage 160 may be either an input power supply voltage or the output from a previous pump stage. The output from second pump stage 170 provides the input to the next stage, or to an output stage if second pump stage 170 is the last in the charge pump.

The first pump stage 160 is composed of a switching transistor 60, a capacitor 62, a transistor 64 configured to act as a diode when the transistor 60 is switched "on," and a pump capacitor 66. Capacitors 68 and 69 represents the parasitic capacitance on the clock driver side associated with pump capacitors 66 and 67, respectively, and capacitors 70 and 71 represents the parasitic capacitance on the charged nodes St1 and St2, respectively.

Transistors 72 and 74 are used as clock drivers, and power supply voltage line 54 is used as the power source for transistors 74 and 75. If the first pump stage is the first stage in the charge pump, the input supply voltage and the voltage of power supply line 54 are identical, that is, a VDD level. In addition, since the configuration of the second pump stage is the same as the first pump stage St1 except for reference numerals, the detailed description thereof is omitted.

The operation of the pump circuit 14 will now be described using waveforms shown in FIG. 4. At time t1, the clock signal Ph1# goes low, turning on the transistor 74 and thereby charging node S1P to the voltage level VDD of the power supply voltage line 54. When node S1P is charged to the VDD level, the voltage of the node St1 is increased by the pumping operation of the pump capacitor 66 and turns on the switching transistor 60. As the result, node VG1 is charged to an input supply voltage level through the turned-on switching transistor 60. At time t2, the clock signal Ph1a goes high, turning on the transistor 73 and thereby pulling node S2P down to a ground level.

At time t3, the clock signal Ph1# goes high, causing the transistor 74 to disconnect the node S1P from the power supply voltage line 54. Soon after, the clock signal Ph3 goes high, which causes charge transfer switch 80 to be turned on and connect the node S1P to the node S2P. Thus, for the next charging cycle, charge is transferred from the node S1P to the node S2P (i.e. from parasitic capacitor 68 to parasitic capacitor 69). The amount of charge transferred will be one-half that stored in the capacitor 68. Shortly prior to time t4, clock signal Ph3 goes low to disconnect the node SIP from the node S2P.

At time t4, the clock signal Ph2# goes low, charging the node S2P to the power supply voltage. Thus, the switching transistor 61 is turned on according to the voltage of the node St2 using the pumping operation of the pump capacitor 67.

At time t5, the clock signal Ph2a goes high, discharging the charge of the node S1P to the ground side through the transistor 72, and increasing the voltage of the node VG1 to an input supply voltage or more by means of the pumping operation of the capacitor 62. As the result, the switching transistor 65 is turned on by the increased voltage of the node VG1, thereby providing the node St1 and the node VG2 with an input supply voltage without the threshold voltage drop.

At time t6, the clock signal Ph2# goes high, disconnecting the node S2P from the power supply voltage line 54. Shortly after time t6, the clock signal Ph3 goes high, turning on charge transfer transistor 80 and thereby connecting the node S1P to the node S2P. This has the effect of transferring charge from the node S2P to the node S1P (i.e. from capacitor 69 to capacitor 68).

Shortly before time t7, the clock signal Ph3 goes low again, disconnecting the node S1P from the node S2P. At time t7, the clock signal Ph1# goes low, connecting the node S1P to power supply voltage line 54 by means of transistor 74. Thus, the voltage of node St1 is pumped up to the level of an input supply voltage or more. Soon after time t7, the clock signal Ph1*a* goes high, turning on the switching transistor 65 by the pumping of the capacitor 63 and thereby transferring the voltage of the node St1*a* to the node St2. The voltage of the node St2 is pumped by the pump capacitor 67 to be outputted using output transistor 77, when the clock signal Ph2# goes high again.

In this way, in the conventional high voltage generating circuit, the charge stored in the parasitic capacitor 68 (or 69) is transferred to the parasitic capacitor 69 (or 68) through the charge transfer switch 80 to achieve the charge sharing.

However, as described above, the conventional high voltage generating circuit has various disadvantages. The pump circuit needs a predetermined charge sharing time for pre-charging and discharging the parasitic capacitors of two pump stages, which reduces or degrades the operational speed. Further, the charge sharing occurs in the conventional pump circuit only between the two pump stages. Thus, in the case of pump circuit composed of three pump stages, the charge sharing effect is decreased. In addition, in the conventional pump circuit, diode-type transistor 77 is used to prevent the reversal of current at an output stage, reducing or degrading a voltage of the output stage using the diode-type transistor 77. In the conventional high voltage generating circuit, the pumping efficiency is degraded because of the above-described disadvantages.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a voltage generator that reduces power consumption.

Another object of the present invention is to provide a voltage generator that reduces chip area.

Another object of the present invention is to provide a high voltage generating circuit that is capable of reducing power consumption and a chip area.

Another object of the present invention is to provide a charge pump circuit appropriate for a low power chip.

Another object of the present invention is to provide a charge pump circuit appropriate for a low power chip by increasing the pumping efficiency.

To achieve the above objects, there is provided a voltage generator according to the present invention that includes a clock signal generator that generates a plurality of clock signals upon receipt of an oscillation signal, a high voltage clock generator that generates a plurality of high voltage clock signals upon receipt of a clock signal from the clock signal generator, and a pump circuit that alternately performs pumping and pre-charging operations according to the clock signals and the high voltage clock signals from the clock signal generator and the high voltage clock generator, respectively, to output a pumping voltage.

To further achieve the above objects, there is provided a pump circuit in accordance with the present invention that includes first and second pump stages that each alternately perform stage pumping and stage pre-charging operations according to selected ones of a plurality of first clock signals and a plurality of second clock signals, and a pre-charge stage that pre-charges the first pump stage to a power supply level according to one of the second clock signals, wherein each of the pump stages includes first and second pumps with a symmetrical structure, each having a pumping capacitor that alternately performs one of the stage pumping and the stage pre-charging operations during a first clock cycle of the pump circuit, and a charge transfer switch coupled between the pumping capacitors of the first and second pumps to transfer the charge of the pumping capacitor having performed the stage pumping operation to the pumping capacitor having performed the stage pre-charging operation before the first clock cycle of the pump circuit is completed.

To further achieve the above objects, there is provided a voltage generator according to the present invention that includes clock generator means for generating a plurality of clock signals upon receipt of an oscillation signal from an oscillating means, high voltage clock generator for generating a plurality of high voltage clock signals upon receipt of a clock signal, and pump circuit means for alternately performing pumping and pre-charging operations according to the clock signals and the high voltage clock signals from the clock generator means and the high voltage clock generator means, respectively, to output a pumping voltage.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
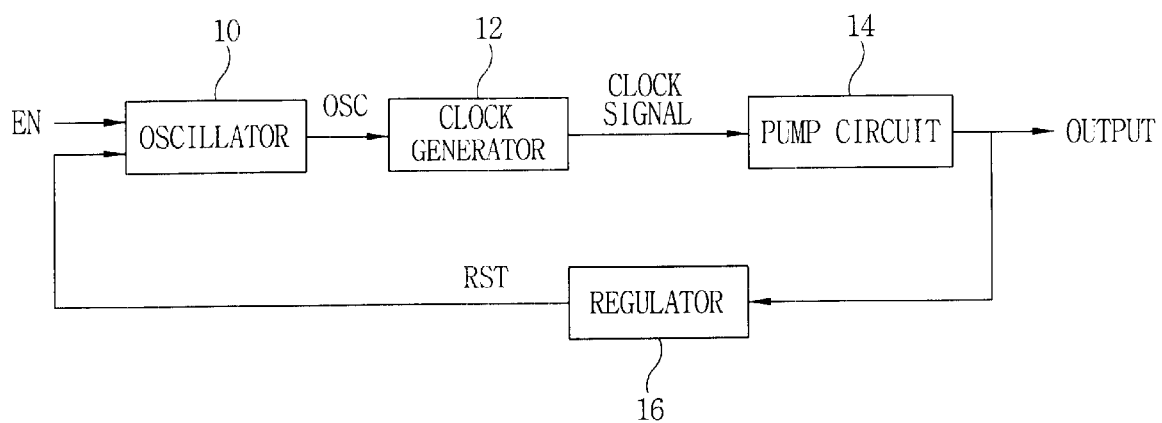
FIG. 1 is a block diagram of a conventional high voltage generating circuit.
Figure 2:
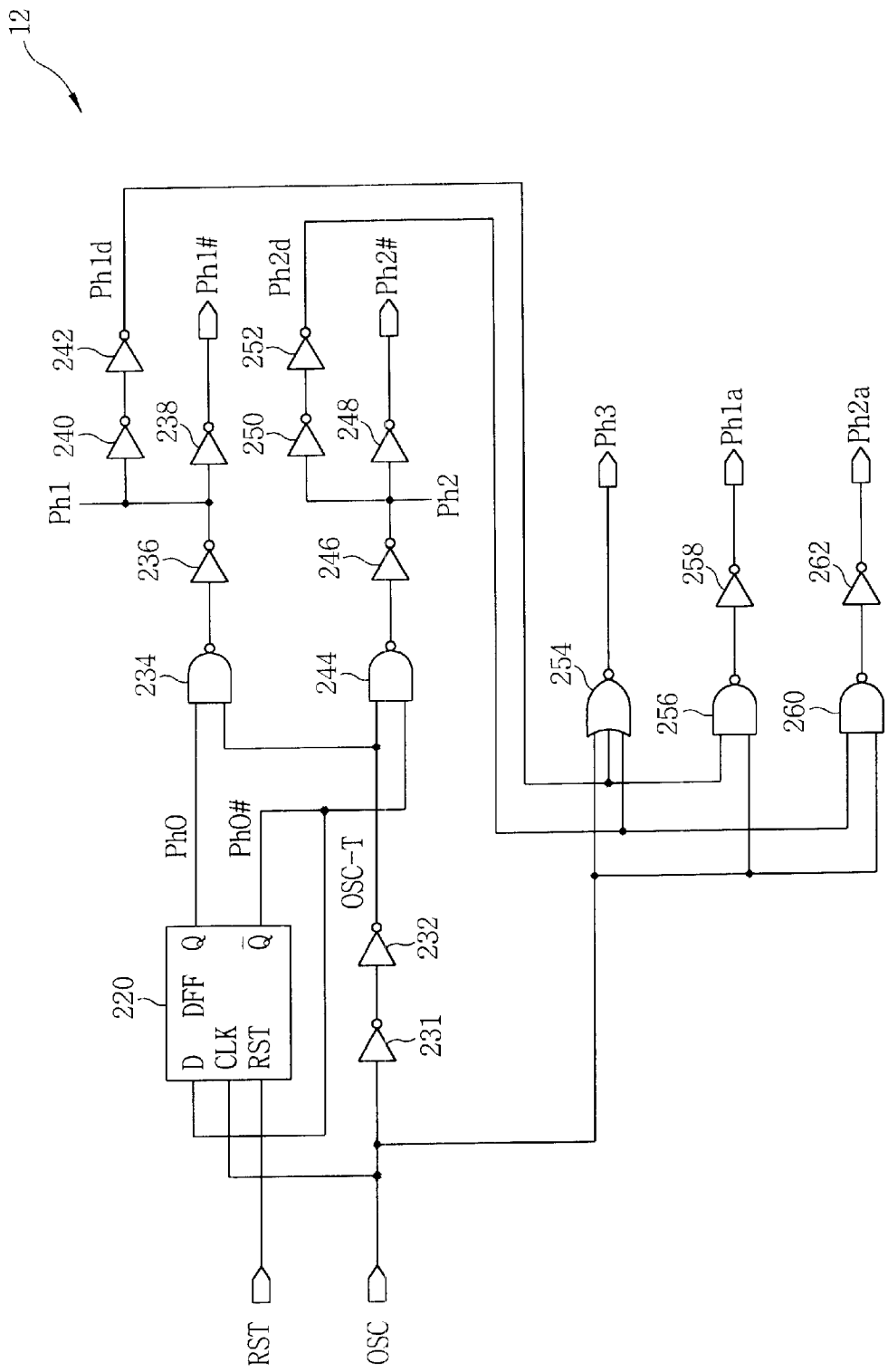
FIG. 2 is a circuit diagram of a clock signal generator in FIG. 1.
Figure 3:
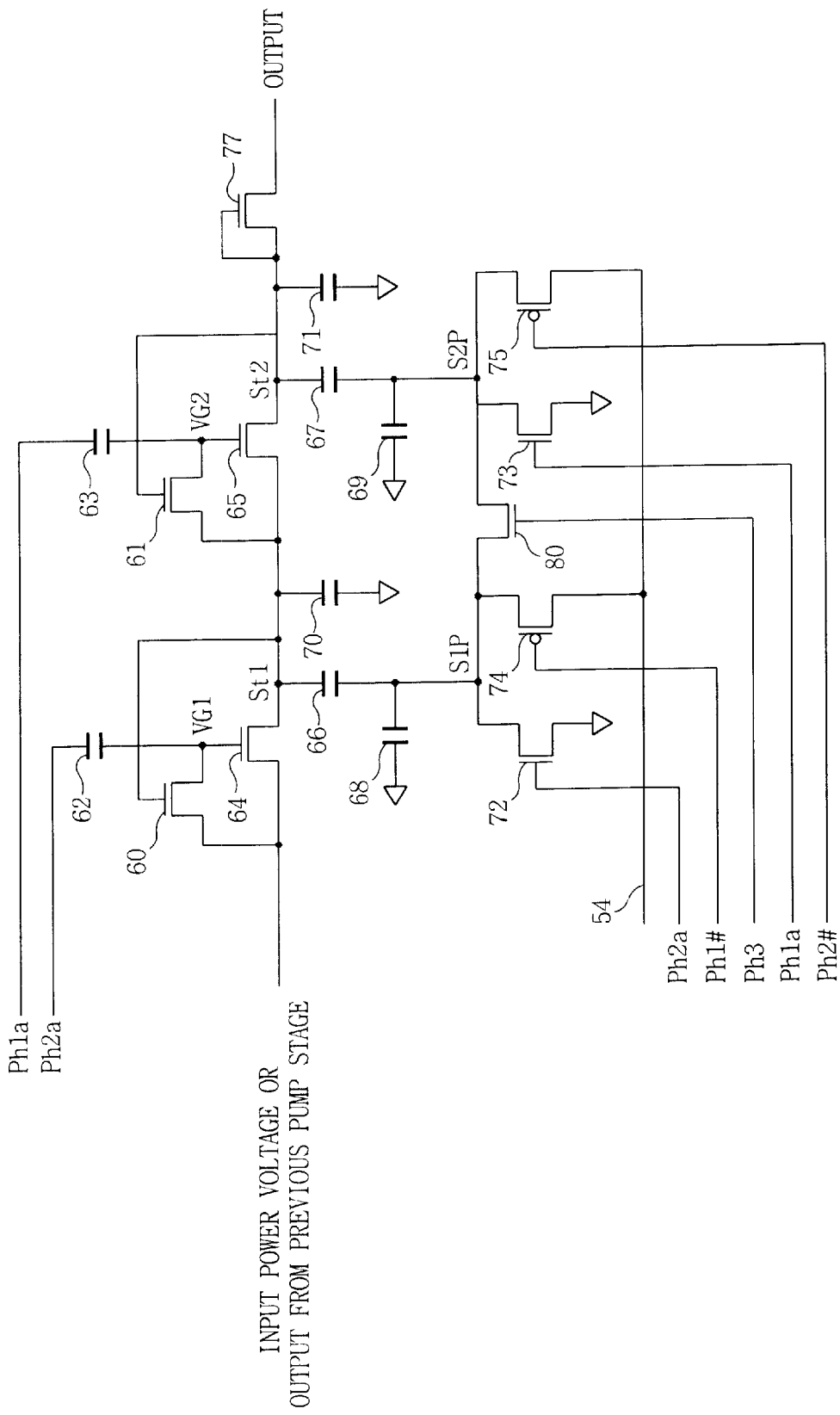
FIG. 3 is a circuit diagram of a pump circuit controlled by a plurality of clock signals in FIG. 2.
Figure 4:
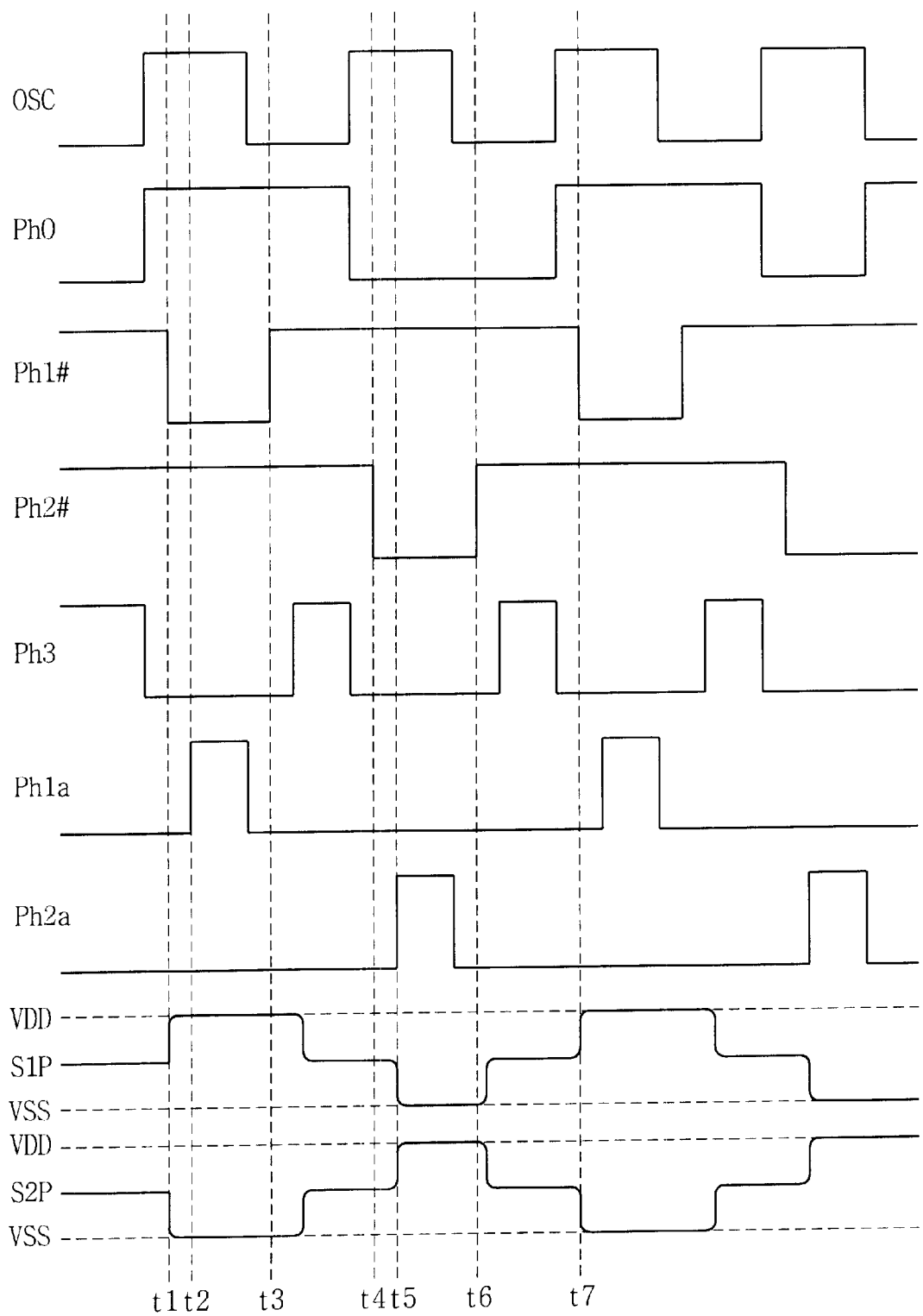
FIG. 4 is a timing diagram of clock signals used to control the operation of the pump circuit illustrated in FIG. 3.
Figure 5:
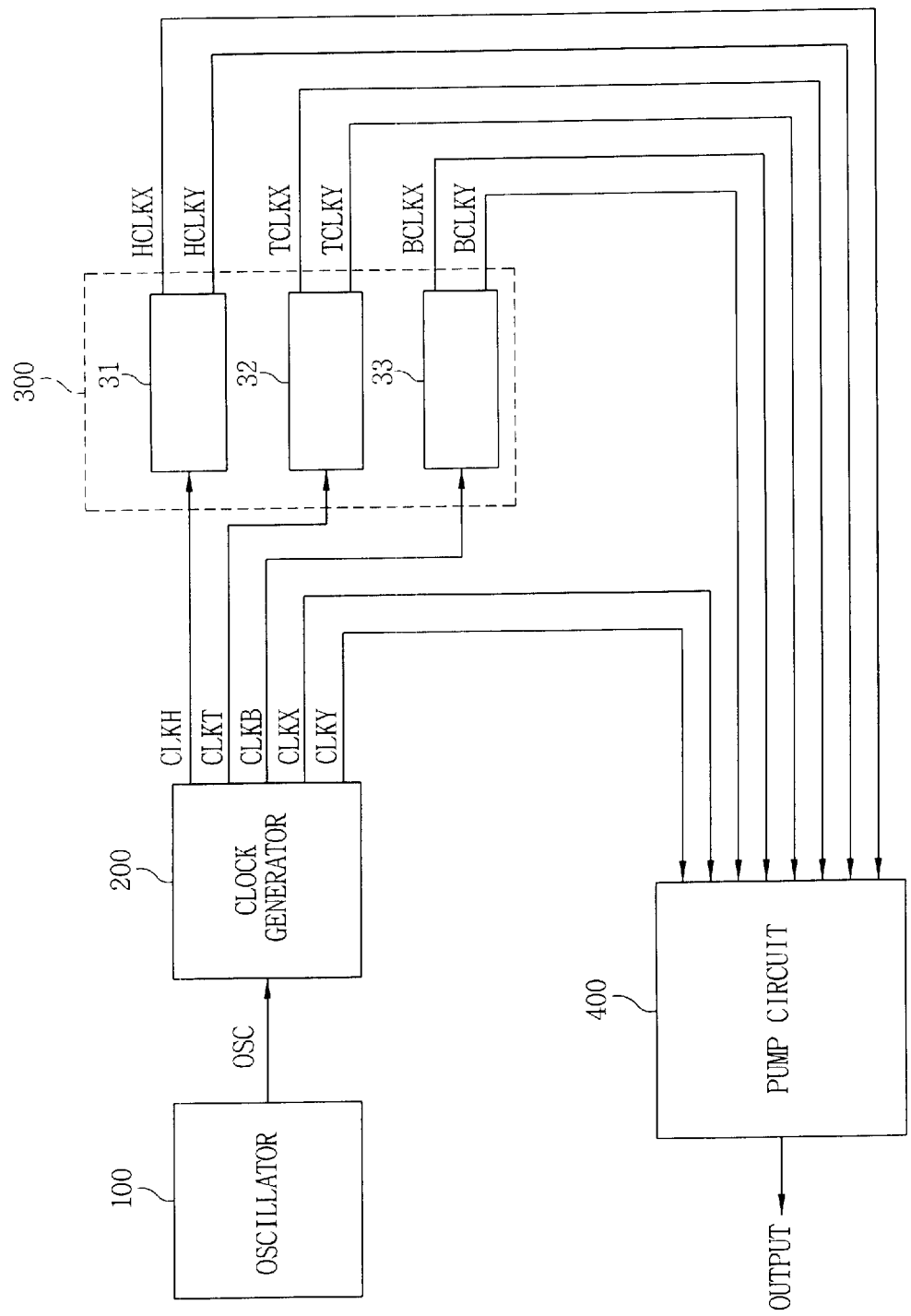
FIG. 5 is a block diagram showing a preferred embodiment of a high voltage generating circuit in accordance with the present invention.

FIG. 5 is a block diagram showing a preferred embodiment of a high voltage generating circuit in accordance with the present invention. As illustrated in FIG. 5, the preferred embodiment of the high voltage generating circuit in accordance with the present invention includes oscillator 100, clock signal generator 200, high voltage clock signal generating unit 300, and pump circuit 400.

Oscillator 100 outputs oscillator signal OSC for triggering the operation of clock signal generator 200. Clock signal generator 200 preferably generates first through fifth clock signals CLKX, CLKY, CLKH, CLKT, and CLKB of a power supply (VDD) level upon receipt of oscillation signal OSC.

Figure 6:
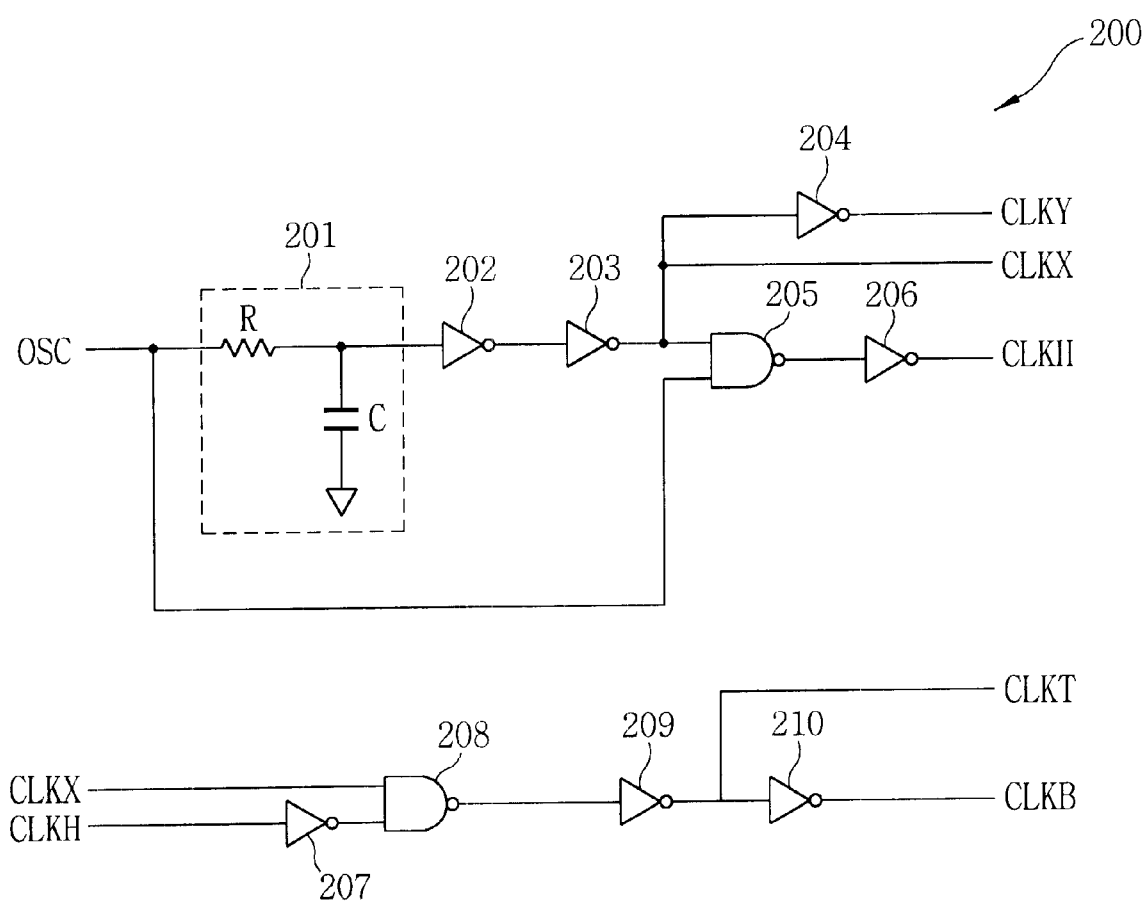
FIG. 6 is circuit diagram showing a clock signal generator in FIG. 5.

FIG. 6 is a diagram that illustrates a circuit diagram of a preferred embodiment of the clock signal generator 200. As illustrated in FIG. 6, input oscillation signal OSC is delayed at RC delayer 201 for a prescribed time, and thereafter sequentially inverted by inverters 202 and 203. The delay time of RC delayer is determined by the charge/discharge time of resistance R and capacitor C. NAND gate 205 NANDs the output of inverter 203 and oscillation signal OSC, and inverter 206 inverts the output of NAND gate 205. Inverter 204 inverts the output of inverter 203. As a result, the outputs of inverters 203,204 and 206 becomes first through third clock signals CLKX, CLKY, and CLKH, respectively.

Figure 7:
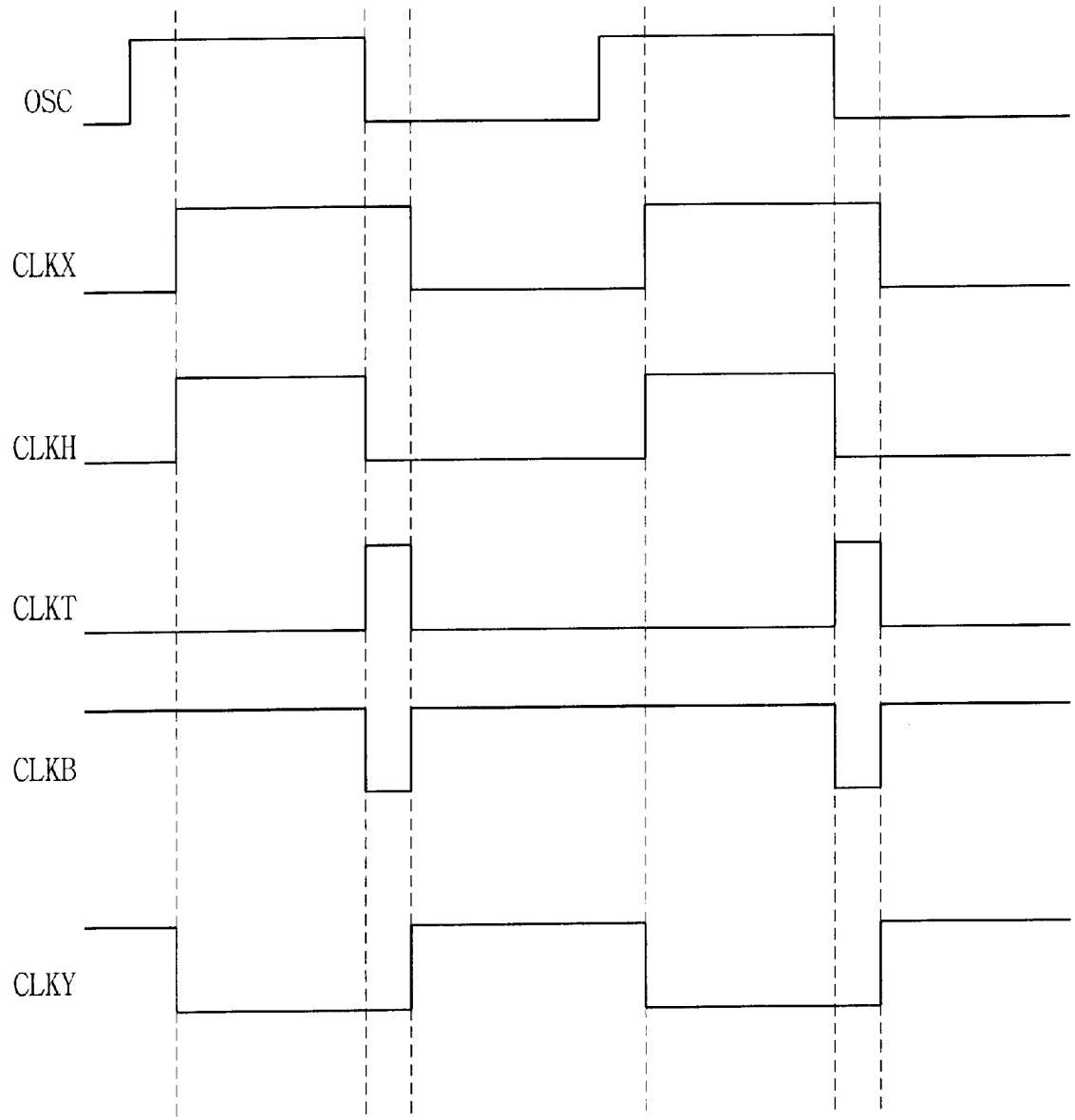
FIG. 7 is a timing diagram showing clock signals outputted from a clock signal generator of FIG. 5.

NAND gate 208 NANDs first clock signal CLKX and third clock signal CLKH inverted by inverter 207, and the output of NAND gate 208 is sequentially inverted by inverters 209 and 210. As a result, the output of inverter 209 becomes fourth clock signal CLKT, and the output of inverter 210 becomes fifth clock signal CLKB. Waveforms of first through fifth clock signals CLKX CLKY, CLKH, CLKT, and CLKB are preferably illustrated in FIG. 7.

High voltage clock signal generating unit 300 preferably outputs first through sixth high voltage clock signals HCLKX, HCLKY, TCLKX, TCLKY, BCLKX, and BCLKY of a high power level and preferably a 2VDD level to pump circuit 400, upon receipt of third through fifth clock signals CLKH, CLKT and CLKB of VDD level from clock signal generator 200. High voltage clock signal generating unit 300 includes first through third high clock generators 31 and 33 preferably having a similar structure. First high voltage clock signal generator 31 preferably generates first and second high voltage clock signals HCLKX and HCLKY upon receipt of third clock signal CLKH. Second high voltage clock signal generator 32 preferably generates third and fourth high voltage clock signals TCLKX and TCLKY upon receipt of fourth clock signal CLKT. In addition, third high voltage clock signal generator 33 preferably generates fifth and sixth high voltage clock signals BCLKX and BCLKY upon receipt of fifth clock signal CLKB.

Figure 8:
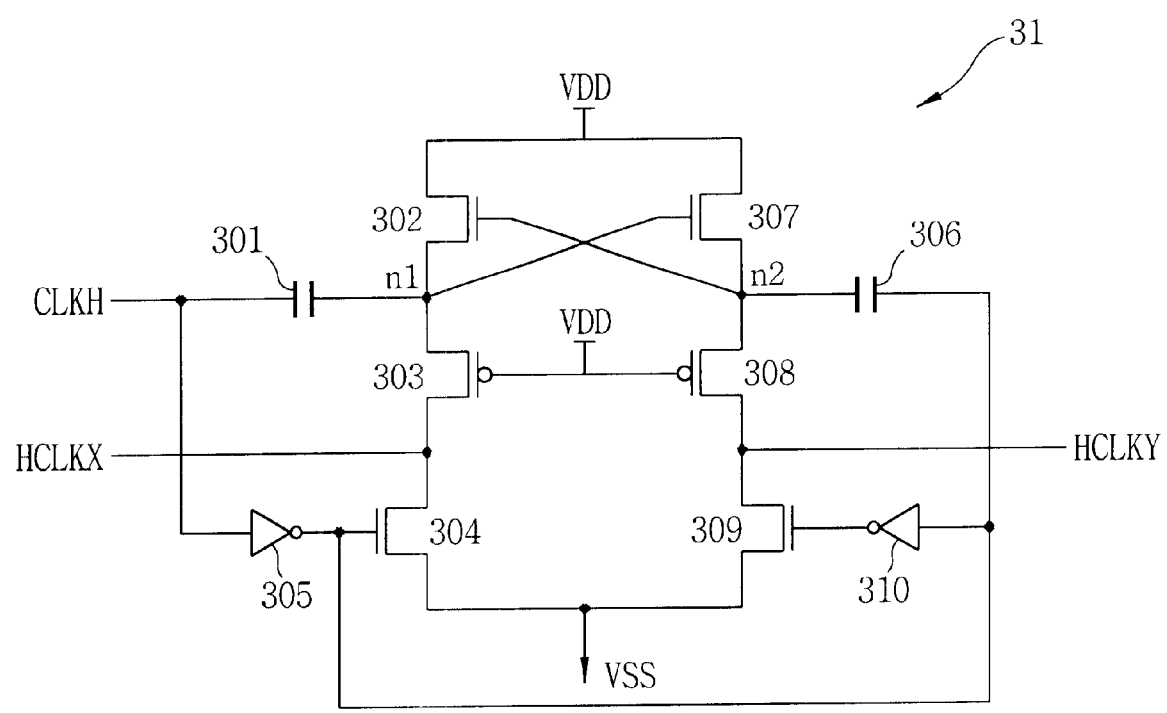
FIG. 8 is a circuit diagram showing a preferred embodiment of a high voltage clock signal generator of FIG. 5.

FIG. 8 is a circuit diagram showing a preferred embodiment of first through third high voltage clock signal generators 31 through 33, which will be described using first high voltage clock signal generator 31 as an example. Capacitors 301 and 306 preferably alternatingly perform their pumping and pre-charging operation according to the level of third clock signal CLKH. That is, when third clock signal CLKH goes high, for example, capacitor 301 pre-charged to a VDD level in the previous cycle performs the pumping operation. PMOS transistor 303 and NMOS transistor 307 are turned on by the pumping voltage (e.g., 2VDD level) of capacitor 301, and NMOS transistor 309 is turned on by third clock signal CLKH sequentially inverted by inverters 305 and 310. Thus, first high voltage clock signal HCLKX becomes the 2VDD level by the pumping voltage of the 2VDD level transferred through PMOS transistor 303, and second high voltage clock signal HCLKY becomes the ground level by a ground voltage (VSS) level. At this time, capacitor 306 is pre-charged to a VDD level by the power supply voltage VDD transferred through transistor 307.

Figure 9:
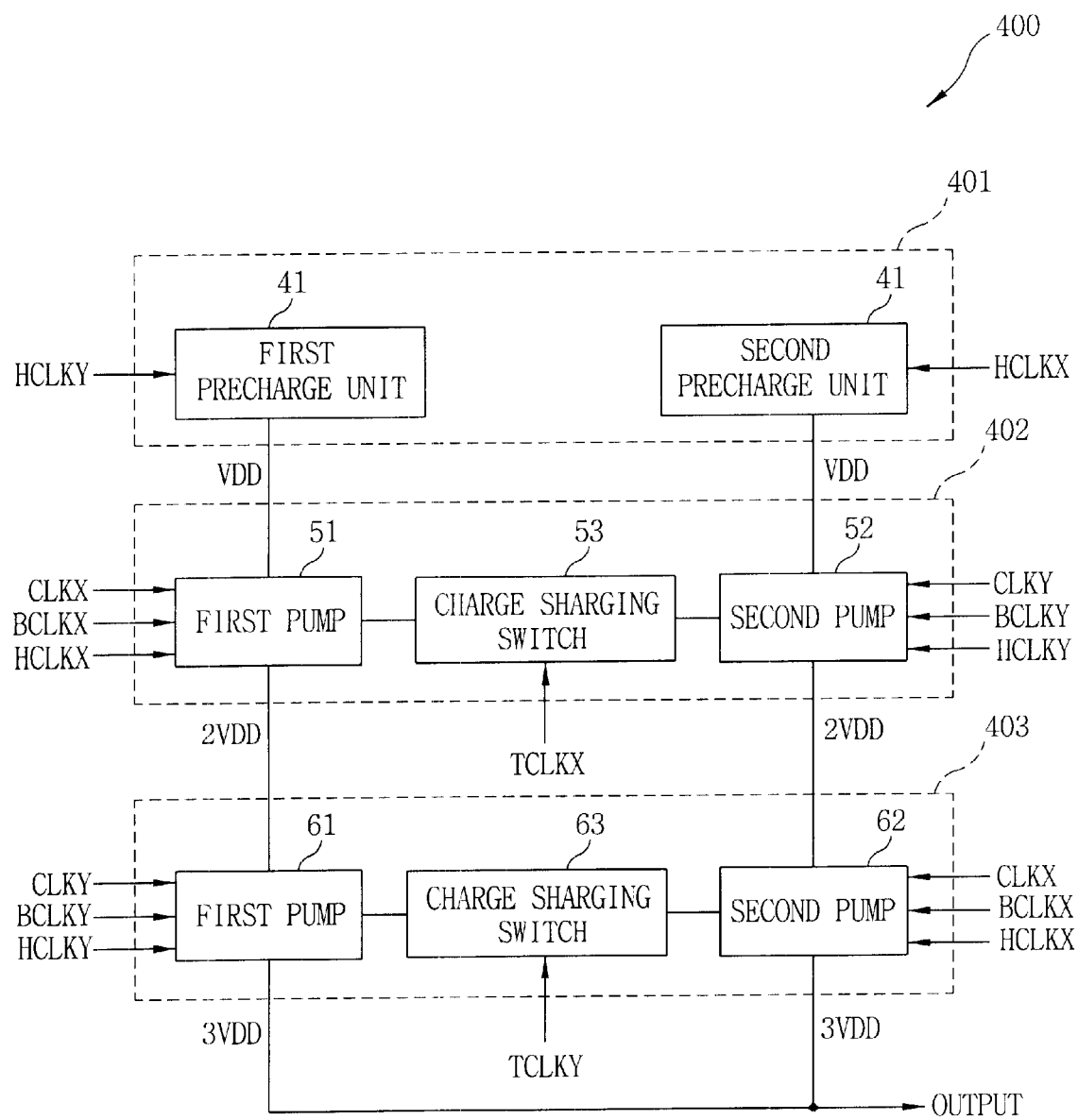
FIG. 9 is a block diagram showing a preferred embodiment of a pump circuit in FIG. 5.

Pump circuit 400 is preferably controlled by first and second clock signals CLKX and CLKY of the VDD level outputted from clock signal generator 200, and first through sixth high voltage clock signals HCLKX, HCLKY, TCLKX, TCLKY, BCLKX, and BCLKY of the 2VDD level outputted from high voltage clock signal generating unit 300 for thereby performing the pumping operation FIG. 9 is a block diagram showing a preferred embodiment of pump circuit 400 in accordance with the present invention. As shown in FIG. 9, the pump circuit 400 includes a pre-charge stage 401 and preferably first and second pump stages 402 and 403. The number of pump stages connected to pre-charge stage 401 can be added or removed according to the desired level of an output voltage.

Pre-charge stage 401 is a block used to pre-charge first pump stage 402 to the VDD level, in which first and second pre-charge units 41 and 42 forms a pair of pre-charges. Thus, first and second pre-charge units 41 and 42 alternatingly pre-charge first pump stage 402 according to the level of second and first high voltage clock signals HCLKY and HCLKX, respectively.

First pump stage 402 is used to pump the pre-charge voltage VDD outputted from pre-charge stage 401 to 2VDD, and second pump stage 403 is used to pump the voltage 2VDD outputted from pre-charge stage 401 to 3VDD. First pump stage 402 includes first and second pumps 51 and 52 respectively connected to first and second pre-charge units 41 and 42 for thereby forming a pair of pumps, and charge sharing switch 53 for sharing the charge between first and second pumps 51 and 52. First and second pumps 51 and 52 preferably have a symmetrical structure with each other. Charge sharing switch 53 is preferably implemented in the form of a transistor.

Second pump stage 403 includes first and second pumps 61 and 62 and charge sharing switch 63. The construction of first and second pumps 61 and 62 is preferably identical to that of first pump stage 402 except for the sequence of clock signals. That is, clock signals CLKY, BCLKY and HCLKY inputted to second pump 52 of first pump stage 402 are inputted to first pump 61. Clock signals CLKX, BCLKX and HCLKX inputted to first pump 51 of first pump stage 402 are inputted to second pump 62. This allows first and second pumps 61 and 62 of second pump stage 403 to perform a pre-charging operation and a pumping operation, respectively, when first and second pumps 51 and 52 of first pump stage 402 performs, in turn, a pumping operation and a pre-charging operation, respectively.

For example, when a plurality of pump stages are coupled to pre-charge stage 401, clock signals CLKX, BCLKX and HCLKX are inputted to first pumps of odd numbered pump stages and second pumps of even numbered pump stages, and clock signals CLKY, BCLKY and HCLKY are inputted to second pumps of odd numbered pump stages and first pumps of even numbered pump stages.

Figure 10:
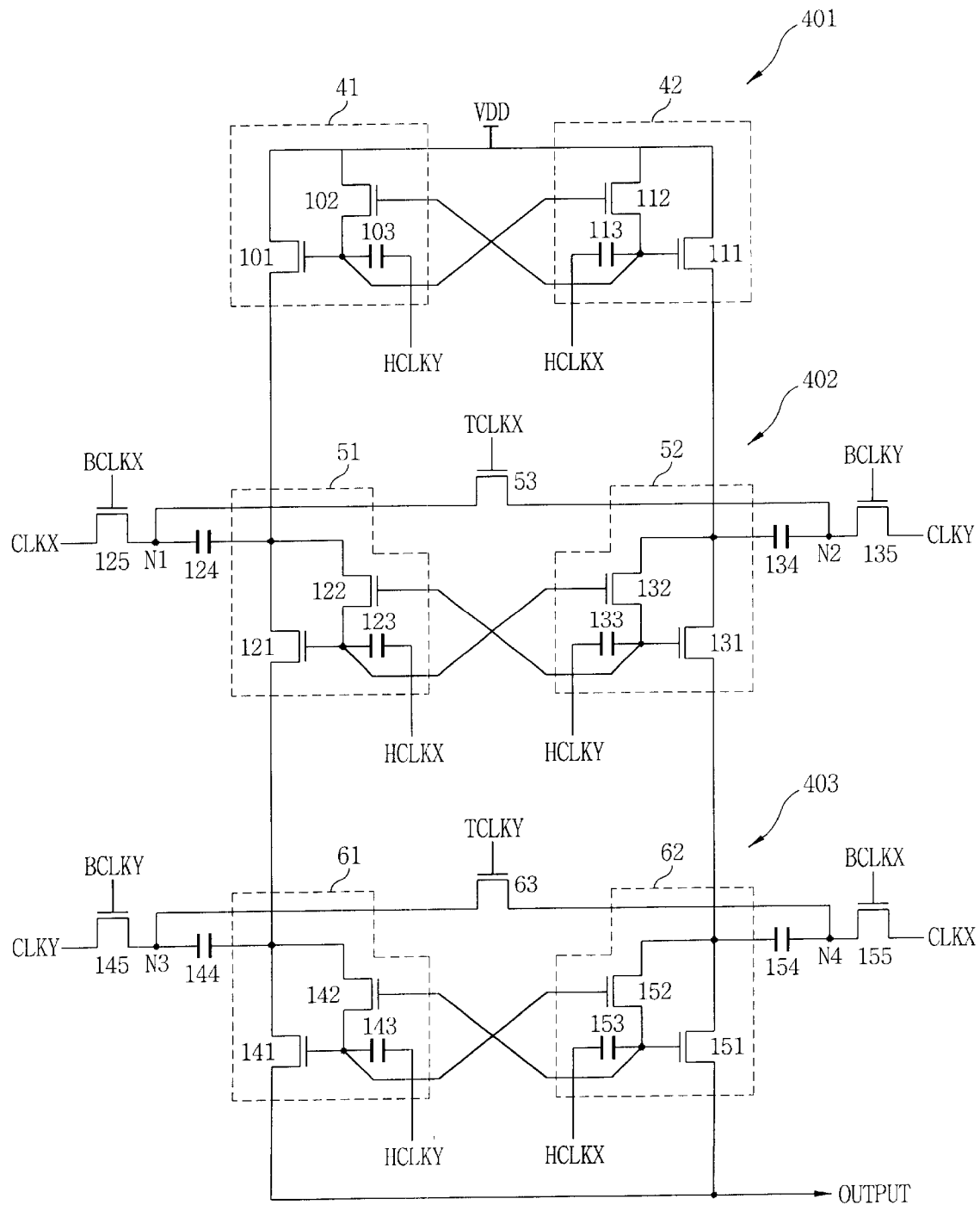
FIG. 10 is a circuit diagram showing a pump circuit illustrated in FIG. 9.

Respective charge sharing switches 53 and 63 of first and second pump stages 402 and 403 are preferably each used to transfer charge from the pump stage performing its pumping operation to the pump stage performing its pre-charging operation. For example, charge sharing switch 53 transfers the charge of the pump capacitor in first pump 51 to the second pump capacitor (not shown) of second pump 52 for a predetermined time (e.g., charge sharing) before first pump 51 performs its pumping operation and then pre-charging operation, thereby reducing the operating current when second pump 52 performs its pre-charging operation and then pumping operation. Third and fourth high voltage clock signals TCLKX and TCLKY of 2VDD level are preferably applied to the gate of charge sharing switch 53 and 63, thus increasing the charge sharing speed FIG. 10 is a block diagram showing a preferred embodiment of pump circuit 400 corresponding to the block diagram of FIG. 9. As shown in FIG. 10, at first and second pre-charge units 41 and 42, 101 and 111 preferably denote a transfer transistor, 102 and 112 denote a pre-charge transistor, and 103 and 113 denote a gate pumping capacitor. Gate pumping capacitors 103 and 113 perform their pumping operation according to second and first high voltage clock signals HCLKY and HCLKX, respectively. Transfer transistors 101 and 111 transfer a power supply voltage VDD to first pump stage 402 according to the pumping voltage 2VDD of gate pumping capacitors 103 and 113. And, pre-charge transistor 102 pre-charges gate pumping capacitor 103 to the power supply voltage VDD according to the gate voltage of transfer transistor 111, and pre-charge transistor 112 pre-charges gate pumping capacitor 113 to the power supply voltage VDD according to the gate voltage of transfer transistor 101.

At first and second pumps 51 and 52, 124 and 134 preferably denote a pump capacitor, 121 and 131 denote a transfer transistor, and 122 and 132 denote a pre-charge transistor. In addition, 125 and 135 are each a transistor used to control the input of first and second clock signals CLKX and CLKY, respectively, and 53 is a charge sharing switch preferably implemented in the form of a NMOS transistor.

Transistors 122 and 132 and capacitors 123 and 133 are used to compensate for the drop (2VDD−Vt) of the pumping voltage 2VDD due to the threshold voltage Vt of transfer transistors 121 and 131. That is, the gate voltages of transfer transistors 121 and 131 are increased as much as VDD compared to the drain voltage, thereby preventing the drop of the pumping voltage 2VDD. At second pump stage 403, first and second pumps 61 and 62 preferably have the same construction as first and second pumps 51 and 52 except for the number of each device and the clock signal inputted to each device. Accordingly, a detailed description is omitted.

Operations of the preferred embodiment of the high voltage generating circuit will now be described. Clock signal generator 200 generates first through fifth clock signals CLKX, CLKY, CLKH, CLKT and CLKB of VDD level upon receipt of oscillation signal OSC outputted from oscillator 100. High clock generating unit 300 generates first through high voltage clock signals HCLKX, HCLKY, TCLKX, TCLKY, BCLKX, and BCLKY of 2VDD level upon receipt of third through fifth clock signals CLKH, CLKT and CLKB among first through fifth clock signals CLKX, CLKY, CLKH, CLKT and CLKB. Pump circuit 400 performs its pumping operation according to the level of first and second clock signals CLKX and CLKY outputted from clock signal generator 200 and first through sixth high voltage clock signals HCLKX, HCLKY, TCLKX, TCLKY, BCLKX, and BCLKY to output a pumping voltage of the desired level.

Figure 11:
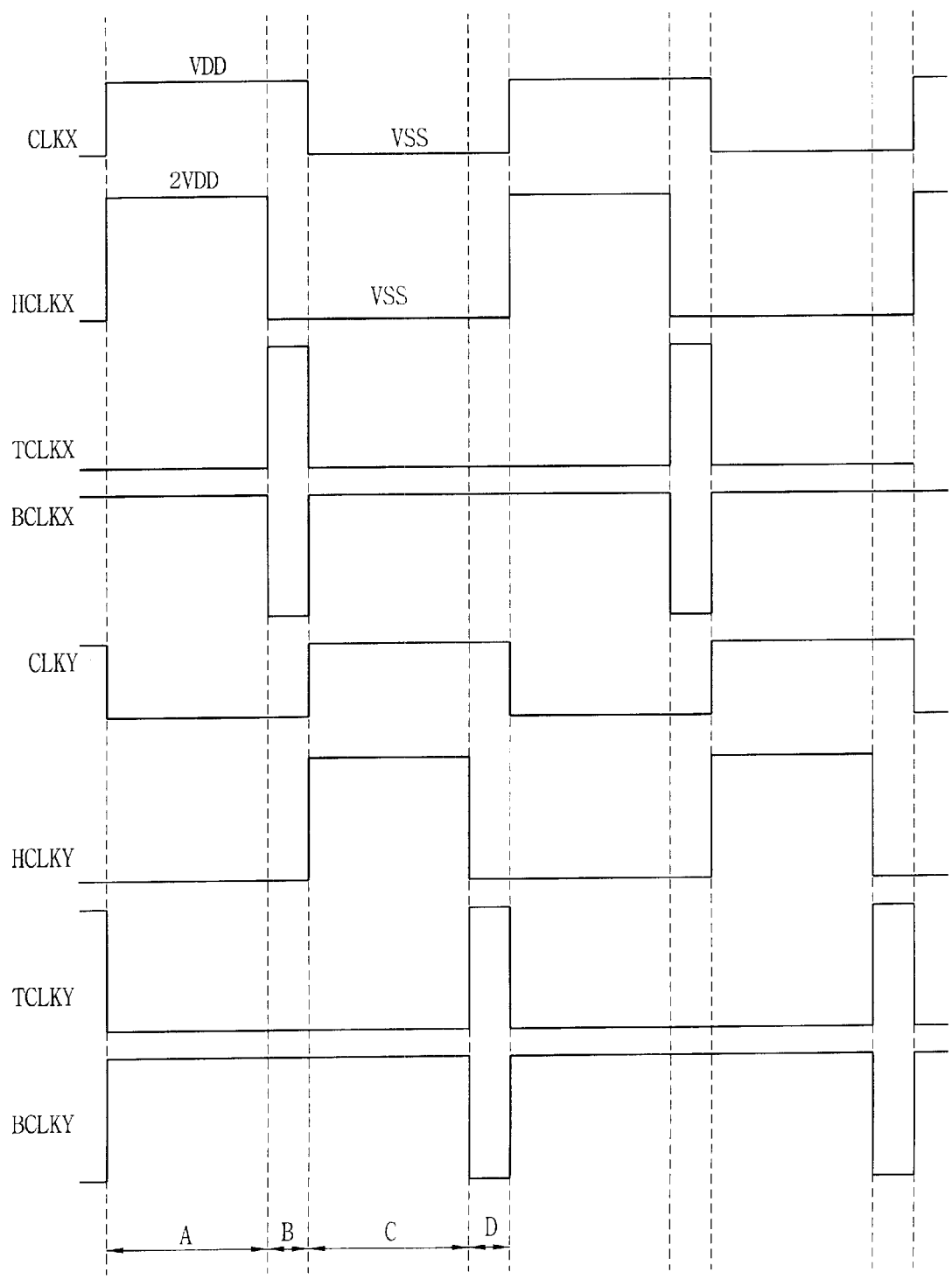
FIG. 11 is a timing diagram showing clock signals used to control the operation of the pump circuit illustrated in FIG. 9.

Operations of pump circuit 400 during one cycle illustrated in FIG. 10 will be described by sections A, B, C and D, respectively, using the waveforms illustrated in FIG. 11. Section A is a section in which first pump stage (e.g., first pump stage 402) performs its pumping operation and second pump stage (e.g., second pump stage 403) is pre-charged. That is, first clock signal CLKX and first, fifth and sixth high voltage clock signals HCLKX, BCLKX and BCLKY go high, and second clock signal CLKY and second and third high voltage clock signals HCLKY and TCLKX go low, turning transistors 125 and 135 of first pump stage 402 on, and turning charge sharing switch 53 off.

Pump capacitor 124 pumps the voltage VDD pre-charged by first pre-charge unit 41 during the previous cycle to a 2VDD. Gate pumping capacitor 123 of second pre-charge unit 42 and gate pumping capacitor 123 of first pump 51 pumps the voltage VDD pre-charged through pre-charge transistors 112 and 122 during the previous cycle to a 3VDD, according to first high voltage clock signal HCLKX of high level 2VDD. As the result, transfer transistor 111 and pre-charge transistor 102 are turned on by the pumping voltage 3VDD of gate pumping capacitor 113, and transfer transistor 121 and pre-charge transistor 132 are turned on by the pumping voltage 3VDD of gate pumping capacitor 123.

Subsequently, the pumping voltage 2VDD of pump capacitor 124 is pre-charged to pump capacitor 144 of second pump stage 403 through transfer transistor 121. And, the power supply voltage VDD is pre-charged to capacitor 103 through transistor 102 while being pre-charged to capacitor 133 through transistors 111 and 132.

Figure 12:
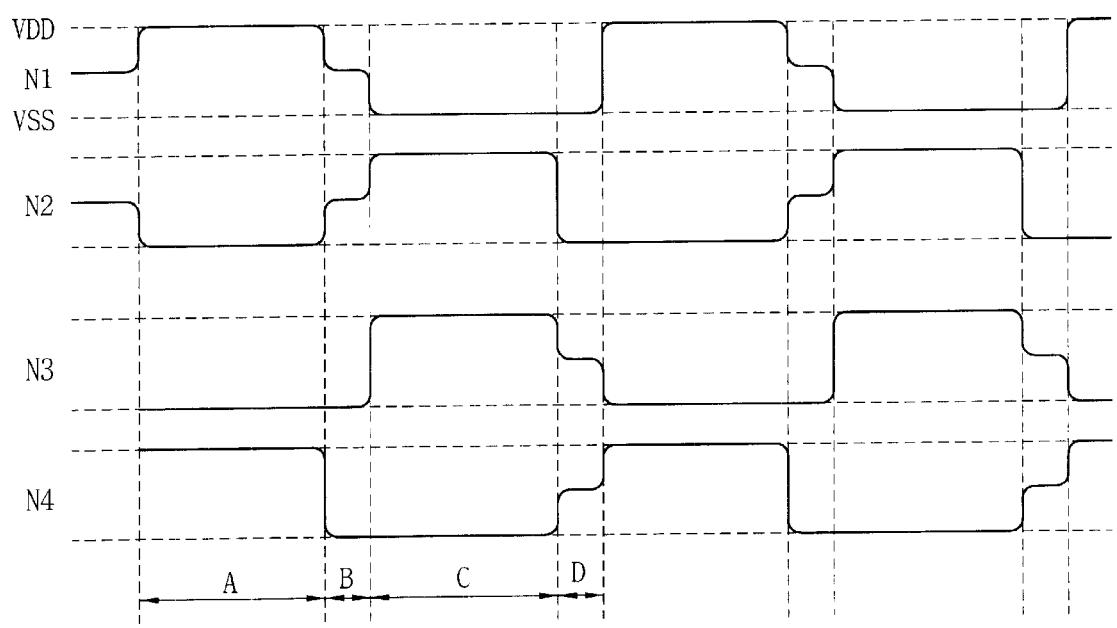
FIG. 12 is a diagram illustrating charge sharing between an input node of a pump capacitor performing a pumping operation and an input node of a pump capacitor performing a pre-charging operation.

Section B is a section in which charge is shared between pump capacitors 124 and 134. During section B, third high voltage clock signal TCLKX goes high, and first and fifth high voltage clock signals HCLKX and BCLKX go low. As the result, transfer transistor 121 is turned off by first high voltage clock signal HCLKX of low level, thereby preventing the reverse current flowing from pump capacitor 144 of second pump stage 403 toward pump capacitor 124 of first pump stage 402. In addition, transistor 125 becomes a floating state by fifth high voltage clock signal BCLKX of low level, and charge sharing switch 53 is turned on by third high voltage clock signal TCLKX of high level. As the result, nodes N1 and N2 are connected with each other by means of charge sharing switch 53, and accordingly, the charge of VDD level charged to node N1 is transferred to node N2 through charge sharing transistor 53 as illustrated in FIG. 12. At this time, the amount of charge transferred is one-half that charged to node N1. Thus, in the preferred embodiments to the present invention, instead of discharging node N1 to a pre-voltage or ground prior to the next pumping cycle, charge is transferred to node N2 (e.g., pump capacitor 134), thereby sharing the charge.

Section C is a section in which first pump 51 of first pump stage 402 is pre-charged by first pre-charge unit 41, and second pump 52 performs its pumping operation. In addition, section C is a section in which first pump 61 of second pump stage 403 performs its pumping operation, and second pump 62 is pre-charged by the pumping voltage of second pump 52.

During section C, first clock signal CLKX goes low, so that node N1 pre-charged to one-half VDD goes to a ground level. Further, sixth high voltage clock signal BCLKY goes high, and node N2, which was pre-charged to one-half VDD, is directly charged to the VDD level by second clock signal CLKY. Therefore, in a preferred embodiment according to the present invention, the voltage required to pre-charge node N2 is about one-half the VDD level.

When node N2 is charged to the VDD level, pump capacitor 134 pumps the voltage VDD pre-charged by second pre-charge unit 42 during the previous cycle to the 2VDD, and thereby pre-charges second pump 62 of second pump stage 403 through transfer transistor 131.

Further, at section C, third and fourth high voltage clock signals TCLKX and TCLKY goes low, and second clock signal CLKY and sixth high voltage clock signal BCLKY goes high, so that pump capacitor 144 pumps the voltage 2VDD pre-charged by pump capacitor 124 included in first pump 51 of first pump stage 402 during the previous cycle to a 3VDD, and the pumped voltage is output using transfer transistor 141. At this time, the operation of other device is identical to that of each device of first pump stage 402, so the detailed description thereof is omitted here.

Section D is a section in which charge is shared between pump capacitors 144 and 154. Similar to section B, in section D charge is transferred from first pump 61 performing its pumping operation to second pump 62 currently performing its pre-charging operation. Thus, in section D, charge is transferred from node N3 to node N4 as illustrated in FIG. 12.

In this way, in operations of the preferred embodiment of the high voltage generating circuit, instead of discharging nodes N1 and N3 to ground prior to the next pumping cycle, charge is transferred to nodes N2 and N4, that is, to pump capacitors 124 and 154 from pump capacitors 134 and 144, thereby sharing the charge. Further, in the preferred embodiment of the high voltage generating circuit according to the present invention, charge sharing is performed, not between two pump stages as in the related art, but between two pair of pump capacitors facing each other in one pump stage.

As described above, preferred embodiments according to the present invention have various advantages. A preferred embodiment of a high voltage generating circuit in accordance with the present invention includes a pre-charge unit and a plurality of pump stages coupled to the pre-charge unit where each pump stage preferably includes a pair of pump units facing each other and a charge sharing transistor used to perform the charge sharing between the pump stages before the pair of pump units performs its pumping and pre-charging operation. Preferred embodiments of a high voltage generating circuit have the effect of reducing active current consumption by sharing the charge of the pump capacitors. Further, a preferred embodiment has the effect of increasing the efficiency of a pump circuit by increasing the charge sharing speed by applying a high voltage to the gate of the charge sharing transistor during a charge sharing. In addition, the preferred embodiments according to the present invention have the effect of implementing a pump circuit regardless of the number of pump stages by performing the charge sharing, not between two pump stages as in the related art, but between two pair of pump capacitors facing each other in one pump stage, and increases the efficiency of a pump circuit by preventing the output voltage drop because a diode-type transistor is not used for the output terminal of the pump circuit.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A high voltage generating circuit, comprising:
   a clock signal generator that generates a plurality of clock signals upon receipt of an oscillation signal;
   a second clock generator that generates a plurality of additional clock signals upon receipt of a clock signal from the clock signal generator; and
   a pump circuit that alternately performs pumping and pre-charging operations according to the clock signals and the additional clock signals from the clock signal generator and the second clock generator, respectively, to output a pumping voltage, wherein the pump circuit comprises,
      first and second pump stages that each alternately perform stage pumping and stage pre-charging operations according to selected ones of the plurality of clock signals and the additional clock signals, and
      a pre-charge stage that pre-charges the first pump stage to a power supply level according to one of the additional clock signals, wherein each of the pump stages comprises,
         first and second pumps, each having a pumping capacitor that alternately performs one of the stage pumping and the stage pre-charging operations during a first clock cycle of the pump circuit, and
         a charge transfer switch coupled between the first and second pumps to transfer the charge of an input node of the pumping capacitor having performed the stage pumping operation to the input node of the pumping capacitor having performed the stage pre-charging operation before the first clock cycle of the pump circuit is completed.

2. The circuit of claim 1, wherein the clock signals are a power supply voltage level, and the additional clock signals are a double the power source voltage level.

3. The circuit of claim 1, wherein the clock signal generator comprises:
   a RC delay circuit that delays the oscillation signal for a prescribed time;
   first and second circuit logic gates coupled in series to an output terminal of the RC delay to generate a first clock signal;
   a third logic gate that logically processes the first clock signal to generate a second clock signal;
   a fourth logic gate that logically processes the first clock signal and the oscillation signal to generate a third clock signal;
   a fifth logic gate that logically processes the first clock signal and an inverted third clock signal to generate a fourth clock signal; and
   a sixth logic gate that logically processes an output of the fifth logic gate to generate a fifth clock signal.

4. The circuit of claim 3, wherein each of the fourth and fifth logic gates comprises a NAND gate and an inverter, and wherein the first through third and sixth logic gates each comprise an inverter.

5. The circuit of claim 1, wherein the second clock signal generator comprises first through third high voltage clock generators, wherein said first high voltage signal generator generates first and second high voltage clock signals upon receipt of a first clock signal, wherein said second clock signal generator generates third and fourth high voltage clock signals upon receipt of a second clock signal, and wherein said second clock signal generator generates fifth and sixth high voltage clock signals upon receipt of a third clock signal.

6. The circuit of claim 5, wherein the second, fourth, and sixth high voltage clock signals are one-half period-delayed versions of the first, third, and fifth high voltage clock signals.

7. The circuit of claim 5, wherein each high voltage clock signal generator comprises:
   a first capacitor coupled between a first node and an input terminal that receives an input clock signal;
   a first transistor coupled between a first prescribed voltage and the first node having a gate that receives a voltage of a second node at a gate;
   a second transistor coupled between a first output terminal and a second prescribed voltage having a gate that receives an inverted input clock signal;
   a second capacitor having a first electrode to which the inverted input clock signal is applied and a second electrode coupled to the second node;
   a third transistor coupled between the first prescribed voltage and the second node;
   a fourth transistor coupled between the second node and a second output terminal having a gate that receives the first prescribed voltage;
   a fifth transistor coupled between the second output terminal and the second prescribed voltage having a gate that receives the input clock signal; and
   a sixth transistor coupled between the first node and the first output terminal.

8. The circuit of claim 7, wherein the first output terminals output the sixth, eighth and tenth high voltage clock signals, respectively, and wherein the second output terminals output the seventh, ninth and eleventh high voltage clock signals, respectively, and wherein gates of the fourth and sixth transistors receive a third prescribed voltage and a gate of the third transistor is coupled to the first node.

9. The circuit of claim 1, wherein the additional clock signals are high voltage clock signals.

10. The circuit of claim 1, wherein the selected ones of the clock signals and the additional clock signals respectively inputted into the first and second pumps of the first pump stage are identical to the clock signals and the additional clock signals respectively inputted into the second and first pumps of the second pump stage.

11. The circuit of claim 1, wherein the second pump of the first pump stage is pre-charged to the power supply level by a second pre-charge unit, and the first pump of the second pump stage is pre-charged to twice the power supply level by the first pump of the first pump stage when the first pump of the first pump stage performs the stage pumping operation.

12. The circuit of claim 1, wherein the charge transfer switch is a transistor having a gate that receives a high voltage clock signal.

13. The circuit of claim 1, wherein each of the first and second pumps comprises:
   a first transistor that receives one of the additional clock signals at a gate that receives clock signals at a first electrode;
   the pumping capacitor coupled to a second electrode of the first transistor;
   a second transistor that transfers the pumping voltage of the pumping capacitor to a next pumping stage, wherein the second transistor has a first electrode coupled to the pumping capacitor;
   a third transistor coupled between the first electrode and gate of the second transistor; and
   a second capacitor that pumps a gate voltage of the second transistor when a corresponding additional clock signal is applied, wherein the third transistor pre-charges the second capacitor when the other pump in the pump stage performs its pumping operation.

14. The circuit of claim 13, wherein a second subset of the selected ones of the clock signals and additional clock signals inputted into each device of the second pump is an one-half period-delayed version of a first subset of the selected ones of the clock signals and additional clock signals inputted into each device of the first pump.

15. A pump circuit, comprising:
   first and second pump stages that each alternately perform stage pumping and stage pre-charging operations according to selected ones of a plurality of first clock signals and a plurality of second clock signals; and
   a pre-charge stage that pre-charges the first pump stage to a prescribed voltage level according to one of the second clock signals, wherein each of the pump stages comprises,
      first and second pumps, each alternately performs one of the stage pumping and the stage pre-charging operations during a first clock cycle of the pump circuit, and
      a charge transfer switch coupled between the first and second pumps to transfer the charge of one of the first and second pumps having performed the stage pumping operation to the other of the first and second pumps having performed the stage pre-charging operation before the first clock cycle of the pump circuit is completed.

16. The circuit of claim 15, wherein the selected ones of the first clock signals and the second clock signals respectively inputted into the first and second pumps of the first pump stage are identical to the first clock signals and the second clock signals respectively inputted into the second and first pumps of the second pump stage.

17. The circuit of claim 15, wherein at least one of the first and second pumps comprises:
   a first transistor that receives second clock signals at a gate and that receives first clock signals at a first electrode;
   the pumping capacitor coupled to a second electrode of the first transistor;
   a second transistor that transfers the pumping voltage of the pumping capacitor to a next pumping stage, wherein the second transistor has a first electrode coupled to the pumping capacitor;
   a third transistor coupled between the first electrode and gate of the second transistor; and
   a second capacitor that pumps a gate voltage of the second transistor when a corresponding second clock signal is applied, wherein the third transistor pre-charges the second capacitor when the other pump in the pump stage performs its pumping operation.

18. The circuit of claim 17, wherein a second subset of the first clock signals and the second clock signals inputted into each device of the second pump is an one-half period-delayed version of a first subset of the clock signals and the second clock signals inputted into each device of the first pump.

19. The circuit of claim 15, wherein the pump circuit further comprises:
   a clock signal generator that generates the plurality of first clock signals of a power supply level upon receipt of a first control signal; and a high voltage clock signal generator that generates the plurality of second clock signals of double power supply level upon receipt of one of the first clock signals from the clock signal generator, wherein the charge transfer switch is a transistor having a gate that receives second clock signals.

20. A voltage generating circuit, comprising:

clock generator means for generating a plurality of clock signals upon receipt of an oscillation signal from an oscillating means;

high voltage clock generator means for generating a plurality of high voltage clock signals upon receipt of a clock signal; and pump circuit means for alternately performing pumping and pre-charging operations according to the clock signals and the high voltage clock signals from the clock generator means and the high voltage clock generator means, respectively, to output a pumping voltage, wherein the pump circuit means comprises first and second pump stage means for alternately performing stage pumping and stage pre-charging operations according to selected ones of the plurality of clock signals and the plurality of high voltage clock signals, and wherein each of the pump stage means comprises, first and second pumps, each having pumping means for alternately performing one of the stage pumping and the stage pre-charging operations during a first clock cycle of the pump circuit means, and charge transfer means coupled between the first and second pumps to transfer the charge of an input node of the pumping means having performed the stage pumping operation to the input node of the pumping means having performed the stage pre-charging operation before the first clock cycle of the pump circuit means is completed.

21. A high voltage generating circuit, comprising:

a clock signal generator that generates a plurality of clock signals upon receipt of an oscillation signal;

a second clock generator that generates a plurality of additional clock signals upon receipt of a clock signal from the clock signal generator; and a pump circuit that alternately performs pumping and pre-charging operations according to the clock signals and the additional clock signals from the clock signal generator and the second clock generator, respectively, to output a pumping voltage, wherein the clock signal generator comprises, a RC delay circuit that delays the oscillation signal for a prescribed time, first and second circuit logic gates coupled in series to an output terminal of the RC delay to generate a first clock signal, a third logic gate that logically processes the first clock signal to generate a second clock signal, a fourth logic gate that logically processes the first clock signal and the oscillation signal to generate a third clock signal, and a fifth logic gate that logically processes the first clock signal and an inverted third clock signal to generate a fourth clock signal.

22. The circuit of claim 21, wherein the clock signal generator comprises a sixth logic gate that logically processes an output of the fifth logic gate to generate a fifth clock signal wherein each of the fourth and fifth logic gates comprises a NAND gate and an inverter, and wherein the first through third and sixth logic gates each comprise an inverter.

23. A high voltage generating circuit, comprising:

a clock signal generator that generates a plurality of clock signals upon receipt of an oscillation signal;

a second clock generator that generates a plurality of additional clock signals upon receipt of a clock signal from the clock signal generator; and a pump circuit that alternately performs pumping and pre-charging operations according to the clock signals and the additional clock signals from the clock signal generator and the second clock generator, respectively, to output a pumping voltage, wherein the second clock generator comprises a plurality of high voltage clock signal generators, and wherein each high voltage clock signal generator comprises, a first capacitor coupled between a first node and an input terminal that receives an input clock signal, a first transistor coupled between a first prescribed voltage and the first node having a gate that receives a voltage of a second node at a gate, a second transistor coupled between a first output terminal and a second prescribed voltage having a gate that receives an inverted input clock signal, a second capacitor having a first electrode to which the inverted input clock signal is applied and a second electrode coupled to the second node, a third transistor coupled between the first prescribed voltage and the second node, a fourth transistor coupled between the second node and a second output terminal having a gate that receives the first prescribed voltage, a fifth transistor coupled between the second output terminal and the second prescribed voltage having a gate that receives the input clock signal, and a sixth transistor coupled between the first node and the first output terminal.

\* \* \* \* \*